(12) United States Patent
Ichikawa et al.

(10) Patent No.: US 7,507,460 B2
(45) Date of Patent: Mar. 24, 2009

(54) PLUGGED HONEYCOMB STRUCTURE AND METHOD OF MANUFACTURING THE SAME

(75) Inventors: Yukihito Ichikawa, Nagoya (JP); Mitsuru Miyamoto, Kariya (JP); Shinya Mori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 294 days.

(21) Appl. No.: 10/537,810

(22) PCT Filed: Dec. 10, 2003

(86) PCT No.: PCT/JP03/15797

§ 371 (c)(1),
(2), (4) Date: Jun. 7, 2005

(87) PCT Pub. No.: WO2004/052502

PCT Pub. Date: Jun. 24, 2004

(65) Prior Publication Data

US 2006/0029769 A1 Feb. 9, 2006

(30) Foreign Application Priority Data

Dec. 11, 2002 (JP) ............................ 2002-359232

(51) Int. Cl.
*B32B 3/12* (2006.01)
(52) U.S. Cl. ...................... 428/116; 428/117
(58) Field of Classification Search ............... 428/116
See application file for complete search history.

(56) References Cited

U.S. PATENT DOCUMENTS 4,293,357 A 10/1981 Higuchi et al.
4,411,856 A * 10/1983 Montierth .................. 264/267
4,573,896 A 3/1986 Bonzo et al.
4,818,317 A 4/1989 Okata et al.
5,720,787 A 2/1998 Kasai et al.
2004/0131772 A1 7/2004 Yamada et al.

FOREIGN PATENT DOCUMENTS

| EP | 0 295 343 A1 | | 12/1988 |
|---|---|---|---|
| EP | 0 677 498 A2 | | 10/1995 |
| EP | 1 245 360 A2 | | 10/2002 |
| EP | 1 418 032 A2 | | 5/2004 |
| JP | 03-066339 | * | 10/1992 |
| JP | 04-301115 | * | 10/1992 |
| JP | A 8-281034 | | 10/1996 |
| JP | 2002-309922 | * | 10/2002 |
| JP | A 2002-309922 | | 10/2002 |
| WO | WO00/48807 | * | 8/2000 |

* cited by examiner

*Primary Examiner*—Timothy M Speer
*Assistant Examiner*—Gordon R Baldwin
(74) *Attorney, Agent, or Firm*—Oliff & Berridge, PLC

(57) ABSTRACT

There is disclosed a plugged honeycomb structure 1 having: partition walls 2 arranged in such a manner as to form a plurality of cells 3 extending from one end face 42 to the other end face 44 through an axial direction; an outer peripheral wall 7 which surrounds an outer periphery of the partition wall 2; and plugging portions 4a, 4b disposed in such a manner as to plug the cell 3 in either end face 42, 44. In the plugged honeycomb structure 1, at least some of plugging portions 4a arranged in at least the vicinity of the outer peripheral wall protrude from the end face 42 or 44. Alternatively, there are provided a plugged honeycomb structure 1 in which a tip of the protruding portion 4a is substantially flat or has a moderate curved face, and a method of manufacturing the structure. The plugged honeycomb structure 1 does not easily break, is capable of enhancing durability, and is preferably usable in a filter such as a diesel particulate filter (DPF).

10 Claims, 11 Drawing Sheets

US 7,507,460 B2

PLUGGED HONEYCOMB STRUCTURE AND METHOD OF MANUFACTURING THE SAME

TECHNICAL FIELD

The present invention relates to a plugged honeycomb structure and a method of manufacturing the structure, particularly to a honeycomb structure having plugging portions, which does not easily break and which is capable of enhancing durability and which is preferably usable in a filter such as a diesel particulate filter (DPF), and a method of manufacturing the structure.

BACKGROUND ART

When a honeycomb structure is used as a filter such as a DPF, in general, as shown in FIGS. 11(a) to (c), the structure is used in the form of a plugged honeycomb structure 1 having: porous partition walls 2 arranged in such a manner as to form a plurality of cells 3 each extending from one end face 42 to the other end face 44 in an axial direction; an outer peripheral wall 7 which surrounds outer peripheries of the partition walls 2; and plugging portions 4 which are arranged in such a manner as to plug the cells 3 in either end face. By this configuration, a fluid to be treated flows into the cell from one end face 42, and is discharged from the other end face 44 via another cell 3 through the porous partition wall 2. In this case, the partition wall 2 constitutes a filter to capture particulate matters.

Moreover, as shown in FIG. 12, the plugged honeycomb structure is stored in a can member 20 formed of a metal in a state in which a mat 24 formed of a ceramic is wound around an outer peripheral wall of the structure. The structure is fixed by an annular fixing member 22 disposed in the can member and formed of a metal, attached to an automobile or the like, and used in some case (see, e.g., Japanese Patent Application Laid-Open No. 8-281034).

The plugged honeycomb structure for use in this application has requirements that the structure does not easily break by vibration, pressure loss is small, and resistance to thermal shock is satisfactory.

In a case where the plugged honeycomb structure is used for the DPF, a plugged honeycomb structure has been proposed in which a protruding portion is formed on plugging portions, protruding in a tapered shape toward an upstream side from the end face of the cell, as a method of preventing rapid increase of the pressure loss by deposition of the particulate matters (see, e.g., Japanese Patent Application Laid-Open No. 2002-309922).

DISCLOSURE OF THE INVENTION

An object of the present invention is to provide a plugged honeycomb structure in which a pressure loss is reduced from a viewpoint different from that of the above-described proposal and whose breakage does not easily occur, and a method of manufacturing the structure.

The present inventor has studied cracks that can be generated in the vicinity of an outer peripheral wall in detail in order to solve the problem. As to a conventional plugging portion, as shown in FIG. 11(c), a tip is formed substantially on the same face as an end face 42. Therefore, as shown in FIG. 12, in a case where the plugged honeycomb structure is fixed in a can member 20 by an annular fixing member 22 fixed to the can member 20, an end portion of a partition wall is brought into direct contact with an end portion of the outer peripheral wall and the fixing member 22. Moreover, when a fluid to be treated flows into the can member 20, such as an exhaust gas at high temperature, the can member 20 and the fixing member 22 are heated and expanded. Accordingly, the fixing member 22 moves toward an outer periphery while pressing the end face 42. Therefore, in a case where large heat is applied, it is supposed that cracks are generated in the end face in the vicinity of the outer peripheral wall by a stress received during this movement. A metal wire is knitted into a net shape to form a wire mesh ring (not shown) into a ring shape, and the ring is sometimes disposed as a cushion material between the fixing member 22 and the end face 42. In this case, the wire mesh ring is brought into direct contact with the end face 42, and further bites in an opening of a cell which is not plugged. Moreover, it is also supposed that when the fixing member moves, the wire mesh moves, and a stress is applied to the partition wall of a portion bitten by the wire mesh to induce cracks.

Moreover, when the opening of the cell in the vicinity of the outer peripheral wall is covered with the fixing member 22, the fluid to be treated does not flow into the cell in the vicinity of the outer peripheral wall, the cell cannot perform a function of a filter, and pressure loss increases. When the fluid to be treated at high temperature does not flow into the cell in the vicinity of the outer peripheral wall, a temperature difference is made from an inner cell into which the fluid to be treated at the high temperature flows, and it is supposed that cracks are easily generated by thermal shock.

In the present invention, based on this finding, a contact state of the fixing member with respect to the vicinity of the outer peripheral wall is improved, accordingly a possibility is reduced that the cracks are generated in the vicinity of the outer peripheral wall, and the pressure loss is reduced. That is, there is provided a plugged honeycomb structure having: partition walls arranged in such a manner as to form a plurality of cells extending from one end face to the other end face through an axial direction; an outer peripheral wall which surrounds an outer periphery of the partition wall; and plugging portions disposed in such a manner as to plug the cell in either end face, characterized in that at least some of the plugging portions arranged in at least the vicinity of the outer peripheral wall protrude from the end face, and a tip of a protruding portion is substantially flat or has a moderate curved face.

In the plugged honeycomb structure of the present invention, further some or all of the plugging portions arranged in a portion other than the vicinity of the outer periphery protrude from the end face, and the tip of the protruding portion is preferably substantially flat or has the moderate curved face. The structure preferably has a plugging portion including a protruding portion including a portion whose sectional shape crossing the axial direction at right angles is substantially circular. The structure also preferably has a plugging portion including a protruding portion including a portion whose sectional shape crossing the axial direction at right angles is a substantially polygonal shape, and the substantially polygonal shape further preferably has a shape whose corner portion has been cut into a linear or curved shape. The structure preferably has a plugging portion including a protruding portion whose sectional shape parallel to the axial direction is a substantially quadrangular shape, and the substantially quadrangular shape is further preferably a shape whose corner portion has been cut into a linear or curved shape. In the plugged honeycomb structure of the present invention, a maximum height from the end face to the tip of each protruding portion is preferably substantially equal. Porosity of the protruding portion is preferably smaller than that of another portion of the plugged honeycomb structure.

Moreover, according to the present invention, there is provided a method of manufacturing a plugged honeycomb structure comprising: preparing a honeycomb structure comprising porous partition walls arranged in such a manner as to form a plurality of cells extending from one end face to the other end face through an axial direction, and a plugging step of plugging at least some of the cells in either end face, characterized in that the plugging step includes: a masking sub-step of disposing a film on the end face in such a manner as to mask some of the cells; and a filling sub-step of filling a predetermined cell which is not masked with a plugging material, and the filling sub-step includes: filling the cell with the plugging material up to a height which is not less than a height equal to that of an upper face of the film.

In the filling sub-step of the present invention, the plugging material is preferably applied at least twice. Further in the filling sub-step, the plugging material is also preferably applied once. Furthermore, the plugging material is a slurry including a liquid, and the liquid is preferably a liquid which does not substantially penetrate into the partition wall. In the masking sub-step of the present invention, the film is disposed in such a manner as to cover all the cells, a hole is preferably made in a portion of the film, corresponding to a predetermined cell, and a hole is further preferably made in such a manner that periphery of the hole is raised in a thickness direction of the film. Moreover, the plugging material is a slurry containing a liquid, and viscosity of the slurry is 10 to 1000 dPa·s, further preferably 100 to 600 dPa/s. The plugging material is also preferably a slurry containing at least one type selected from a group consisting of a powdered organic material derived from plant, powdered synthetic resin, powdered carbon-based material, hollow synthetic resin, solid normal-temperature liquid or gas material, high-melting material, porous material, and hollow inorganic material. After filling the cell with the plugging material, volume of the plugging material is expanded, and the protruding portion is preferably protruded from the filter end face.

BEST MODE FOR CARRYING OUT THE INVENTION

A plugged honeycomb structure and a method of manufacturing the structure according to the present invention will be described hereinafter in detail based on a specific embodiment. The present invention is not limited to the following embodiment. It is to be noted that a section crossing an axial direction (for example, an axial direction shown in FIG. 1) at right angles will be hereinafter referred to as an orthogonal section, and a section parallel to the axial direction will be referred to as a parallel section.

Figure 1A:
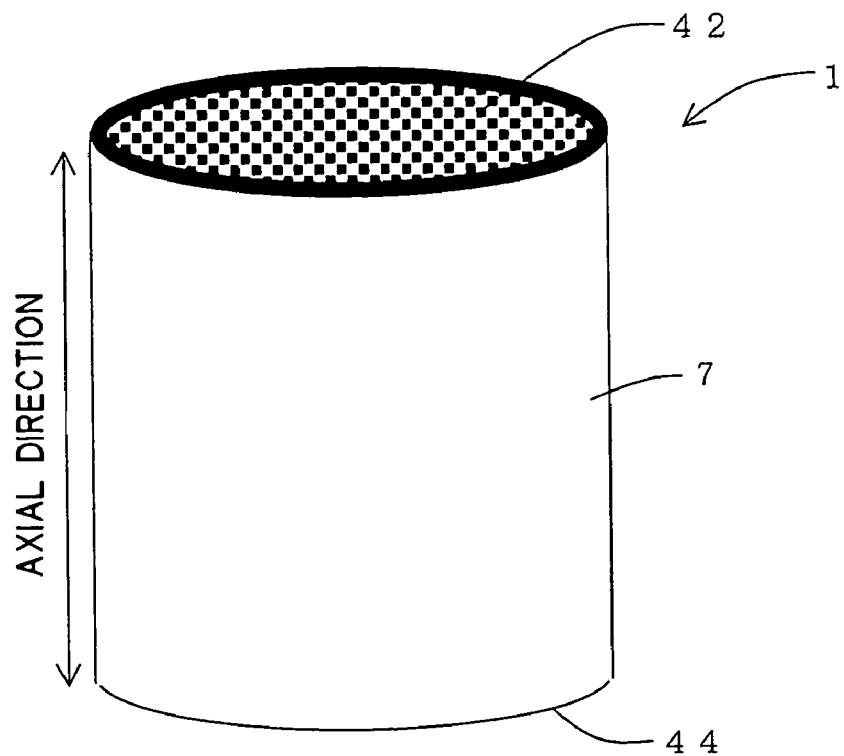
FIG. 1(a) is a perspective view schematically showing one example of a plugged honeycomb structure of the present invention.

As shown in FIGS. 1(a), (b), a plugged honeycomb structure 1 of the present invention has: partition walls 2 arranged in such a manner as to form a plurality of cells 3 extending from one end face 42 to the other end face 44 through an axial direction; an outer peripheral wall 7 which surrounds an outer periphery of the partition wall 2; and plugging portions 4a, 4b arranged in such a manner as to plug the cell 3 in either end face.

Figure 1B:
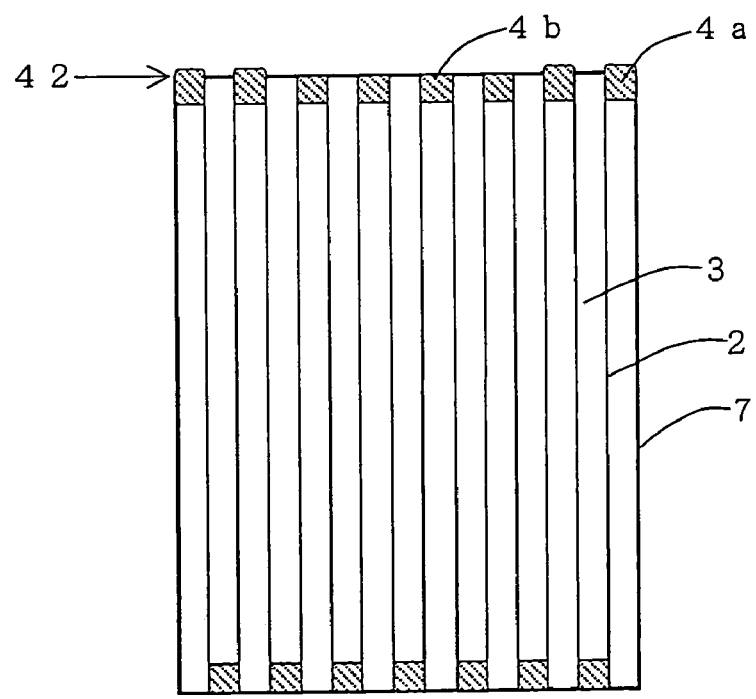
FIG. 1(b) is a parallel sectional view.
Figure 2A:
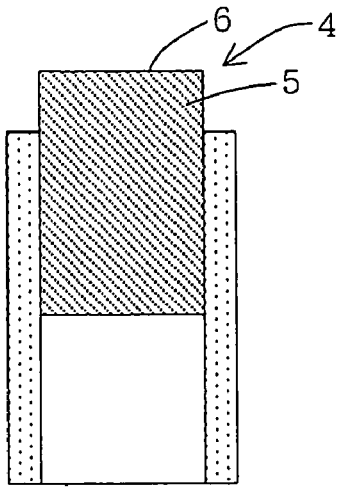
FIG. 2(a) is a partially enlarged parallel sectional view schematically showing one example of plugging portions according to the present invention.
Figure 2B:
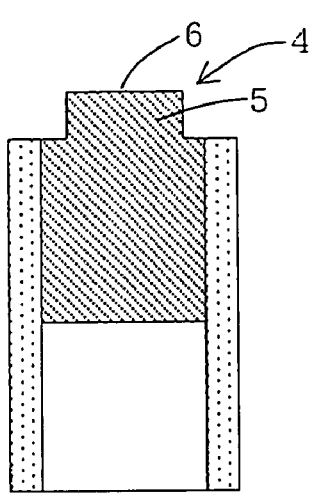
FIG. 2(b) is a partially enlarged parallel sectional view schematically showing another example of plugging portions according to the present invention.
Figure 2C:
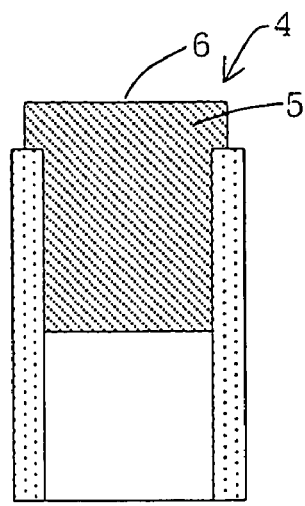
FIGS. 2(c) to (h) are partially enlarged parallel sectional views schematically showing still another example of plugging portions according to the present invention.
Figure 2D:
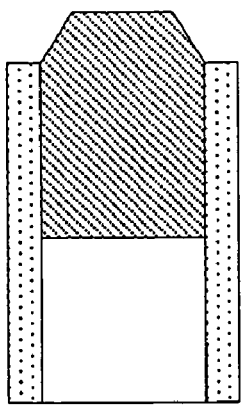
Figure 2E:
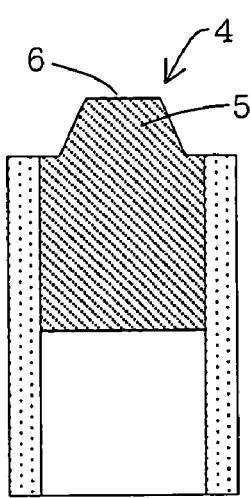
Figure 2F:
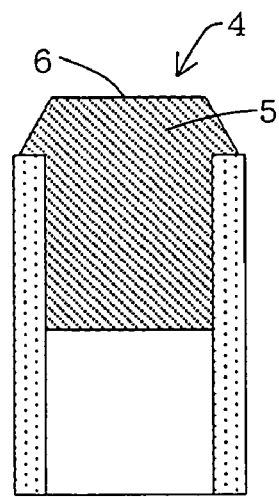
Figure 2G:
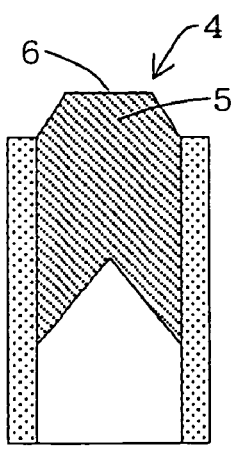
Figure 2H:
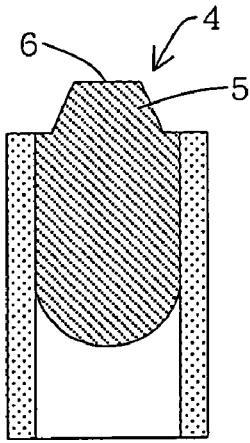

An important characteristic of the present invention lies in that, as shown in FIG. 1(b), at least some of plugging portions 4a arranged in the vicinity of the outer peripheral wall 7 protrude from the end face 42, and a tip 6 of a protruding portion 5 is substantially flat as shown in FIGS. 2(a) to (h), or has a moderate curved face as shown in FIGS. 3(a) to (e).

Figure 4:
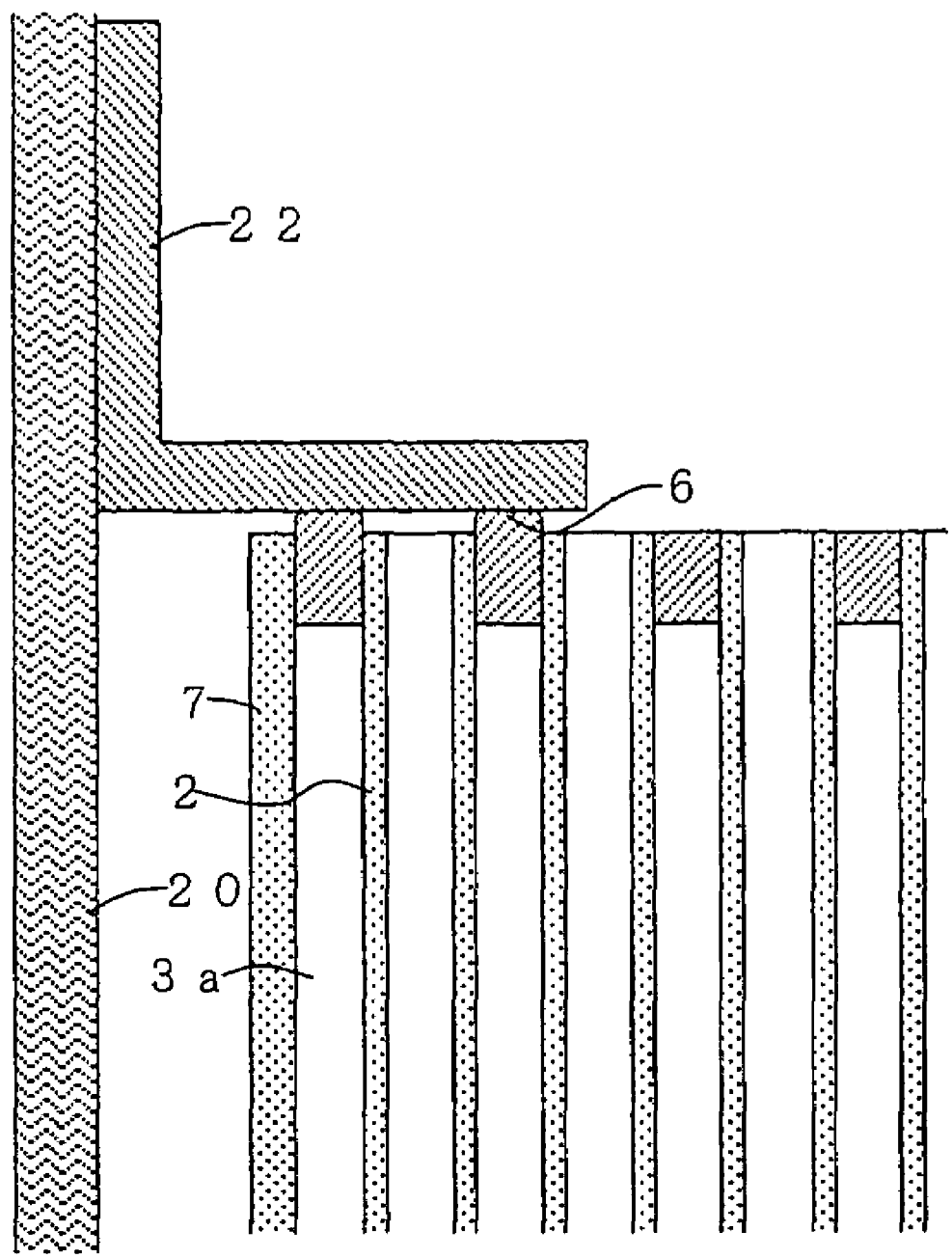
FIG. 4 is a partially enlarged parallel sectional view schematically showing a relation between the plugged honeycomb structure and a fixing member in the present invention.

By this configuration, as shown in FIG. 4, in a case where the plugged honeycomb structure is fixed by a fixing member 22, and stored in a can member 20, the tip 6 is brought into contact with the fixing member 22, and the fixing member 22 is not brought into direct contact with the outer peripheral wall 7 or the partition wall 2 forming a cell 3a in the vicinity of an outer periphery. Although cracks are easily generated by thermal expansion at a time when the fixing member moves toward an outer periphery, the cracks can be reduced in the outer peripheral wall 7 and/or the partition wall 2 forming the cell 3a in the vicinity of the outer periphery.

Moreover, since the cell 3a in the vicinity of the outer periphery is not directly covered with the fixing member 22, a fluid to be treated can flow into the cell in the vicinity of the outer periphery, and pressure losses can be reduced. Furthermore, a temperature difference can be reduced between the cell in the vicinity of the outer periphery and the inner cell, and a possibility of the crack by thermal stress can be reduced.

Figure 13:
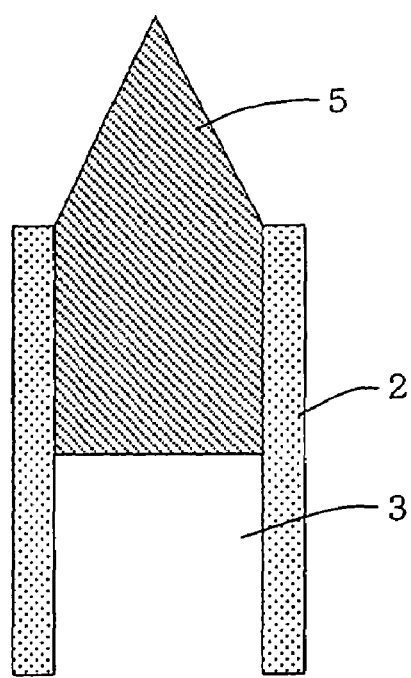
FIG. 13 is a partially enlarged parallel sectional view schematically showing one example of a conventional plugging portion.

From this viewpoint, the protruding portion according to the present invention needs to simply protrude, and further a tip needs to be substantially flat or have a moderate curved face. As shown in FIG. 13, when the protruding portion 5 has a conical or pyramid shape as shown in FIG. 13, an excessive stress is applied to the tip at a time when the structure is fixed by the fixing member, and this causes the cracks in the protruding portion or the vicinity of the outer peripheral wall. Here, when the tip 6 is substantially flat, it is meant that the tip of the protruding portion has a substantially flat portion. The flat portion is preferably as flat as possible, and flatness is preferably about 0.05 mm or less. The flatness of 0.05 mm mentioned herein is the same definition as that of a flatness prescribed by JIS-B0021, means that a contour of the face exists in a space having a width of 0.05 mm, and means that an actually measured flatness value of the flat face which is an object is 0.05 mm or less. For example, plugging portions protruding height from a filter end face is about 0.005 to 0.02 mm. A case where the actually measured flatness value of the protruding portion is 0.01 mm is included in a range of the flatness of 0.05 mm or less. An area of this flat portion may be usually small, but is preferably 5% or more of a sectional area of one cell, that is, a sectional area of plugging portions main body, more preferably 20% or more from a viewpoint that the fixing member be smoothly moved. The smaller flatness of the flat portion is better, and the flatness is preferably 0.05 mm or less. However, when the flatness is smaller, it is actually difficult to prepare the portion. The flatness may increase to about 2 mm by the protruding height of the plugging portion tip and the area of the flat portion, but is practically preferably about 0.1 or less, further 0.5 mm or less, when considering a preparing property, and positional precision or stability of the fixing member. When a difference is excessively large between heights of the protruding portions of the respective plugging portions, the stability of the fixing member is not satisfactory. Therefore, the flatness in the whole protruding portion is also important, and is practically 2 mm or less, preferably 1 mm or less. In short, the fixing member 22 is prevented from being brought into contact with the end portion of the partition wall. Alternatively, even when the member is brought into contact, a contact face pressure is set to be little between the fixing member and the partition wall end portion, and the fixing member may be smoothly moved. When the tip 6 has a moderate curved face, the tip of the protruding portion has a curved face portion to such an extent that the fixing member can smoothly move. Specifically, a curvature radius in the plugging tip portion is R 0.1 mm or more, preferably R 0.5 mm or more, further preferably R 1 mm or more.

Figure 3A:
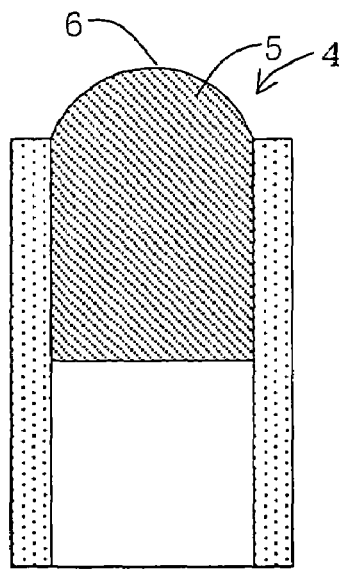
FIGS. 3(a) to (e) are partially enlarged parallel sectional views schematically showing still another example of plugging portions according to the present invention.
Figure 3B:
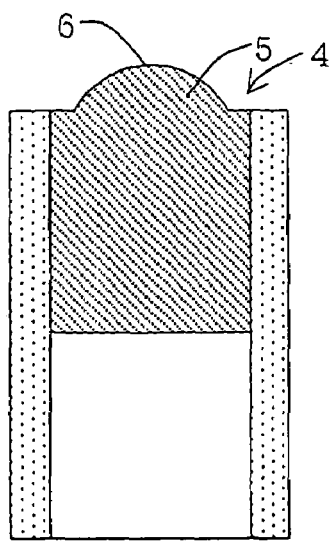
Figure 3C:
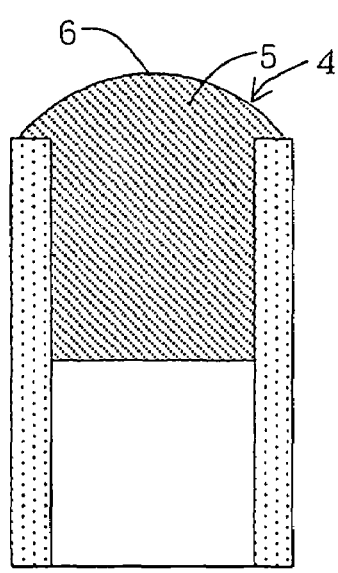
Figure 3D:
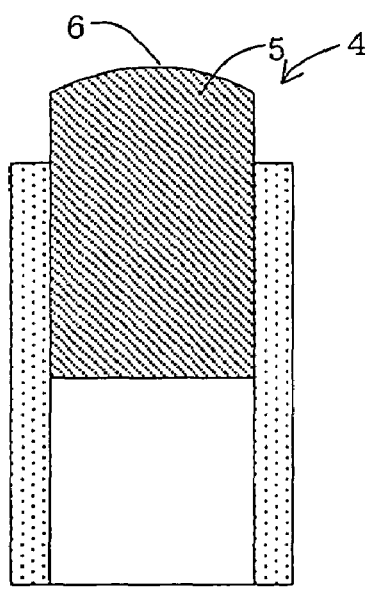
Figure 3E:
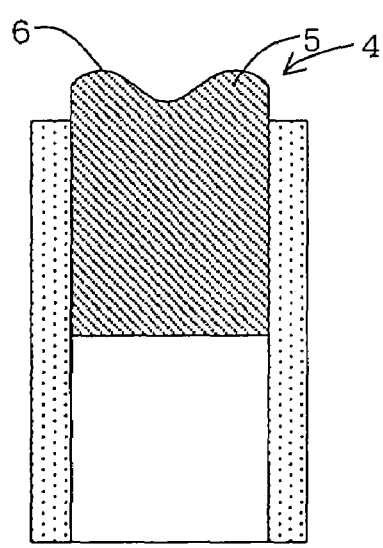
Figure 5A:
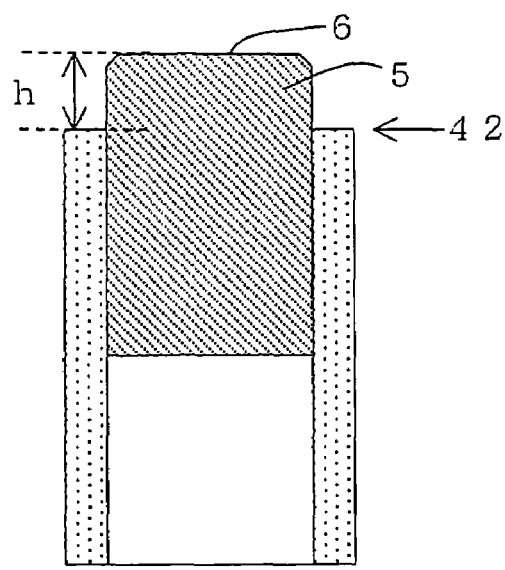
FIGS. 5(a) and (b) are partially enlarged parallel sectional views schematically showing still another example of plugging portions according to the present invention.
Figure 5B:
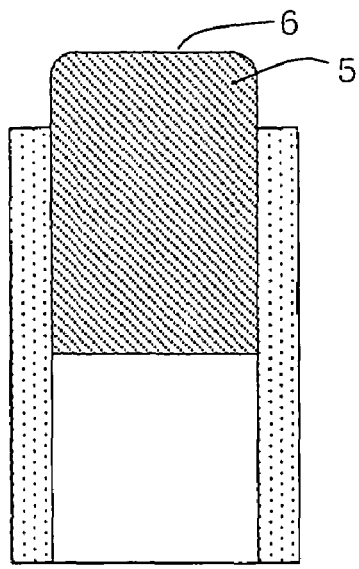

When the protruding portion 5 has the above-described tip 6, there is not any special restriction as to a configuration of the whole protruding portion, but a substantially flat tip is a preferable configuration. For example, as shown in FIGS. 2(a) to (h), there is an example of a configuration in which a parallel sectional shape is a substantially quadrangular shape such as a substantially rectangular shape and a substantially trapezoidal shape. Here, the substantially quadrangular shape includes a quadrangular shape whose corner portion has been cut off in addition to a quadrangular shape. As shown in FIGS. 5(a), (b), the quadrangular shape has a parallel sectional shape whose corner portion has been cut into a linear or curved shape, and this is preferable from a viewpoint of suppressing the cracks in the vicinity of the outer peripheral wall by smooth movement of the fixing member. That is, the tip preferably has a shape whose corner portion has been chamfered. As a preferable specific example of the tip having a moderate curved face, the tip has one domed shape as shown in FIGS. 3(a) to (d), and the tip has two or more domed shapes as shown in FIG. 3(e).

Figure 6A:
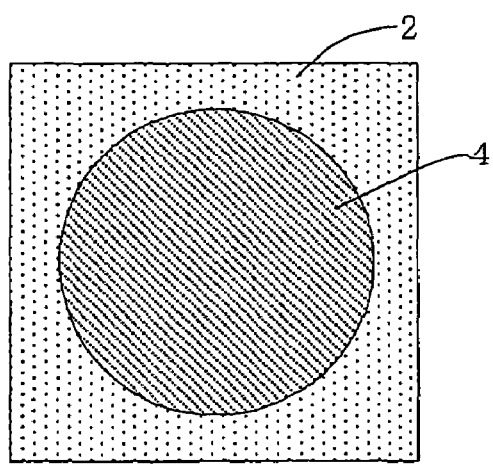
FIGS. 6(a) and (b) are orthogonal section partially enlarged views schematically showing still another example of plugging portions according to the present invention.
Figure 6B:
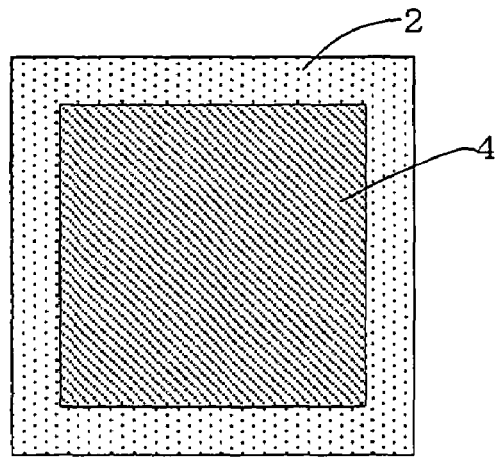

There is not any special restriction as to the orthogonal sectional shape of the protruding portion. As a specific preferable configuration, the protruding portion preferably includes a portion having a substantially circular sectional shape as shown in FIG. 6(a), or a substantially polygonal sectional shape as shown in FIG. 6(b), and preferably includes a portion having a sectional shape similar to that of the cell. When the sectional shape of the cell is a substantially polygonal shape such as a substantially quadrangular shape, the protruding portion preferably has a shape which starts from the same shape as the sectional shape of the cell and which changes into a polygonal shape having more corner portions or a substantially circular shape toward the tip. Here, the substantially circular shape include an elliptic shape, a race track shape and the like in addition to the circular shape, and the substantially polygonal shape includes a shape whose corner portion has been cut into a linear or curved shape in addition to a usual polygonal shape. Moreover, in a case where the sectional shape of the protruding portion includes a substantially polygonal portion, the substantially polygonal shape is preferable whose corner portion has been cut into the linear or curved shape from a viewpoint of suppressing chipping of the corner portion.

In the protruding portion 5, there is not any special restriction as to a height from the end face 42 of a plugged honeycomb structure shown in FIG. 5(a), that is, a maximum height h of the protruding portion. However, when the maximum height h of the protruding portion is excessively large, the protruding portion easily chips. When the height is excessively small, a fluid to be treated does not easily flow into the cell in the vicinity of the outer peripheral wall, and this is not preferable. The maximum height h of the protruding portion is preferably 20 μm or more, further preferably 0.2 mm or more, especially further preferably 0.5 mm or more, preferably not more than a cell pitch length, further preferably 80% or less of the cell pitch length, further especially preferably 50% or less. The maximum height of each protruding portion may differ. However, the maximum height of the protruding portion of each plugging portion disposed in at least the in the vicinity of the outer peripheral wall is substantially equal, and this is preferable from a viewpoint that stress of the fixing member be scattered. From a viewpoint of ease of preparation, the maximum heights of the protruding portions of all the plugging portions are preferably substantially equal. As to a combination with the flatness of the fixing member, when the flatness of the fixing member is satisfactory, and the height of the protruding portion is substantially equal, the height of the protruding portion is less than 20 μm. In this case, the flatness is 0.02 mm, and the protruding portion is preferably 5 μm or more at minimum.

Porosity of the protruding portion of the plugging portion is set to be smaller than that of another portion of the plugged honeycomb structure to densify the structure. Accordingly, effects can be expected that the protruding portion develops strength sufficiently bearing the contact with the fixing member, and the surface of the protruding portion is smoothened to reduce friction with the fixing member. As means for reducing the porosity, there is a method in which a slurry component of a plugging agent is adjusted beforehand, and the structure is fired in such a manner that the porosity of the plugging portion is set to be smaller than that of a honeycomb structure main body. The protruding portion may be coated with a component such as cordierite, silica, and alumina. A Ti-based or W-based hard material may be flame-sprayed to the surface of the protruding portion. That is, the porosity of the whole plugging portion is reduced, accordingly the porosity of the protruding portion is set to be smaller than that of the partition wall, this is a preferable configuration, and it is also a preferable configuration to reduce the porosity of the only protruding portion in the plugging portion.

In the present invention, at least some of the plugging portions which plug the cells arranged in the vicinity of the outer peripheral wall need to have the above-described protruding portions, and it is not essential that all the plugging portions for plugging the cells arranged in the vicinity of the outer peripheral wall have the above-described protruding portions. However, from a viewpoint that the stress applied to the protruding portion from the fixing member be scattered, all the plugging portions for plugging the cells arranged in the vicinity of the outer peripheral wall preferably have the above-described protruding portions. From a viewpoint that the plugging portion be easily formed, all the plugging portions preferably have the above-described protruding portions.

Here, the vicinity of the outer peripheral wall include the cell adjacent to the outer peripheral wall, a range of the vicinity changes with a width of the fixing member, and the range is preferably within 5 mm from the outer peripheral wall, further preferably within 20 mm. Needless to say, even when some or all of the plugging portions arranged not only in the in the vicinity of the outer peripheral portion but also in a portion other than the vicinity of the outer peripheral portion have the protruding portions according to the present invention, that is, even when the protruding portions exist over the whole region of the end face of the honeycomb structure, there is not any practical problem. In the practical use, various foreign matters, for example, oxidized scales from an inner wall of an exhaust tube fly on a flow of an exhaust gas from an exhaust gas upstream of the honeycomb structure, that is, from an engine direction at a high speed, and collide with an exhaust gas inlet end face of the honeycomb structure. Therefore, there is a possibility that a thin partition wall of the honeycomb structure breaks. In this case, when the protruding portion is disposed in the plugging portion in such a manner as to cover a partition wall tip portion as shown in FIGS. 2 (c), (f) or FIG. 3 (c), direct collision of the foreign matters can be prevented with respect to the partition wall. Therefore, the protruding portion of the plugging portion is preferably formed over the whole region of the end face of the honeycomb structure. When the protruding portion is formed, a contact area with the exhaust gas increases, and therefore heat exchange is improved between the plugging portion and the exhaust gas. Since the plugging portion has a larger volume and a larger heat capacity as compared with a peripheral partition wall portion, a follow-up property at exhaust gas temperature is low, a temperature difference is large between the plugging portion and the partition wall portion, and thermal stress is easily generated. When the heat exchange is improved between the plugging portion and the exhaust gas, it can be expected that the temperature difference is reduced, and the thermal stress is suppressed. Therefore, the protruding portion of the plugging portion is preferably formed over the whole region of the end face of the honeycomb structure. Therefore, the protruding portions are preferably disposed in all the plugging portions in the honeycomb structure end face, but this is not necessarily required, and the protruding portions may be appropriately disposed in accordance with a use environment at a practical use time. It is to be noted that the honeycomb structure of the present invention has resistance to the above-described collision with the foreign matters, and an effect of reducing the thermal stress. Therefore, even in a use mode in which any fixing member is not used, for example, a canning structure in which a can member is held without using any fixing member, the plugged honeycomb structure of the present invention can be effectively used. The plugged honeycomb structure is sometimes placed on a face of a base or floor at a transfer time of the plugged honeycomb structure or a handling time. In this case, the corner portion (end portion of the outer peripheral wall) of the end face outer periphery chips in some case. In a case where the plugged honeycomb structure of the present invention is laid on the face of the base, floor or the like, the corner portion of the end face outer periphery is not brought into direct contact with a lower surface, and there is an effect of preventing the chipping. When the protruding portions are formed on the plugging portions in opposite end faces of a DPF, either lower end face preferably has the effect of preventing the chipping.

There is not any special restriction as to a shape or a material of the plugged honeycomb structure in the present invention, as long as the structure has: for example, as shown in FIGS. 1(a), (b), partition walls 2 arranged in such a manner as to form a plurality of cells 3 extending from one end face 42 to the other end face 44 through an axial direction; an outer peripheral wall 7 which surrounds the outer periphery of the partition wall 2; and plugging portions 4 arranged in such a manner as to plug the cells 3 in either end face 42, 44. The orthogonal sectional shape of the plugged honeycomb structure can be appropriately determined, for example, from a circular shape, elliptical shape, race track shape, quadrangular shape and the like in accordance with application or installation place. The orthogonal sectional shape of the cell may be a substantially polygonal shape such as a polygonal shape like a triangular shape, quadrangular shape, or hexagonal shape, or a substantially circular shape such as a circular shape and an elliptical shape. A cell density may be set to, for example, about 6 to 2000 cells/square inch (0.9 to 311 cells/cm$^2$), preferably 50 to 1000 cells/square inch (7.8 to 155 cells/cm$^2$). As shown in FIGS. 1(a), (b), the adjacent cells 3 have plugging portions 4a, 4b in mutually opposite end faces, and the plugging portions are arranged in such a manner that the respective end faces 42, 44 form a checkered pattern. There is not any special restriction as to materials of the plugging portion, partition wall, and outer peripheral wall, but a ceramic or a metal is preferable, the ceramic is especially preferable from a viewpoint of heat resistance or the like. When the structure is used as a catalyst carrier or a filter, the partition wall and the outer peripheral wall is preferably porous. When the plugged honeycomb structure of the present invention is contained in a can member and used, an elastic member is preferably disposed such as a ceramic-formed mat between the can member and the outer peripheral wall.

Figure 7A:
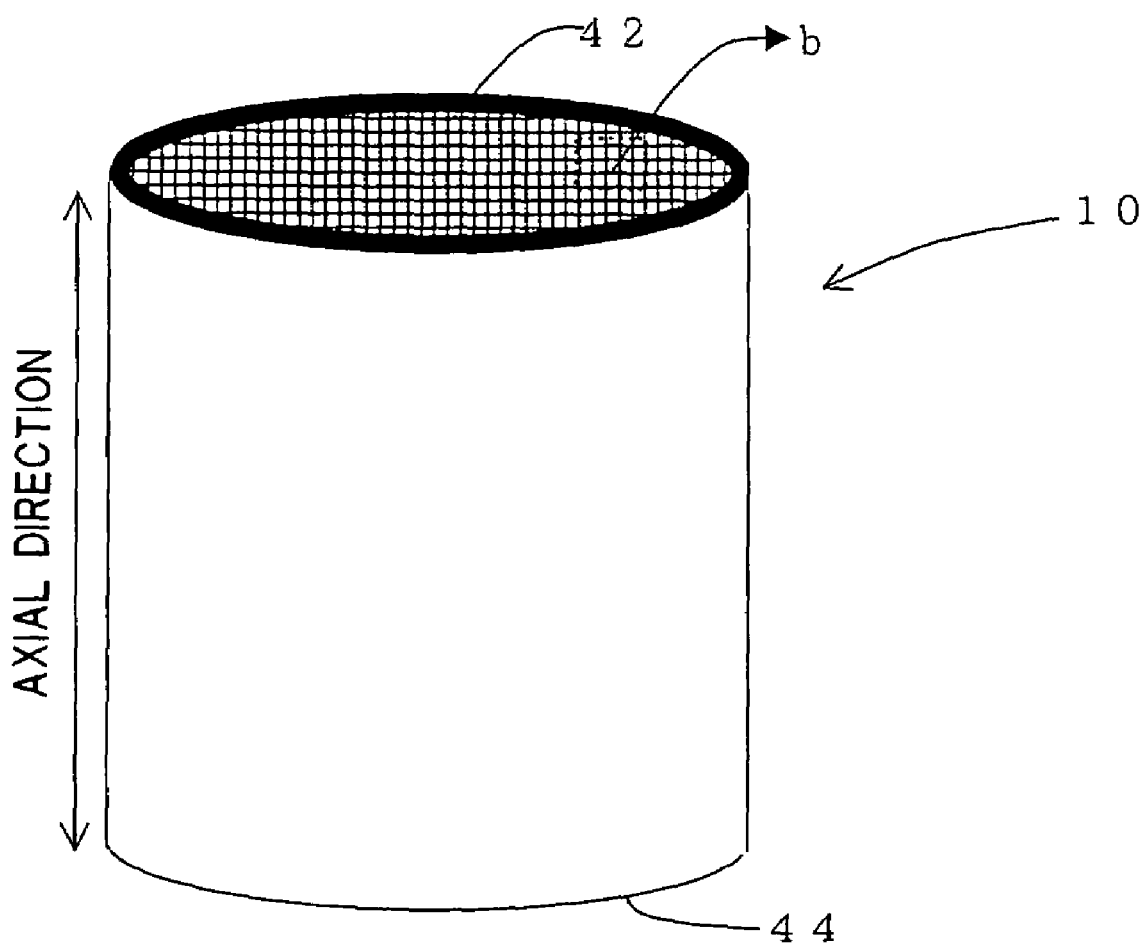
FIG. 7(a) is a perspective view schematically showing one example of a honeycomb structure for use in a manufacturing method of the present invention.
Figure 7B:
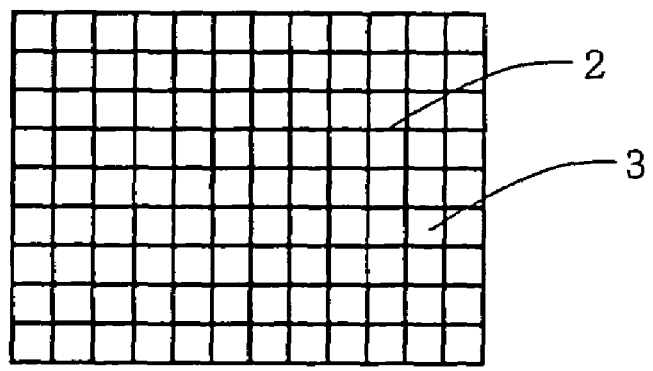
FIG. 7(b) is a partially enlarged plan view.

Next, a manufacturing method will be described capable of preferably manufacturing the plugged honeycomb structure of the present invention. This method includes a plugging step of plugging at least some of the cells 3 in either end face in a honeycomb structure 10 having the partition walls 2 arranged in such a manner as to form a plurality of cells 3 extending from one end face 42 to the other end face 44 through the axial direction as shown in FIGS. 7(a), (b). Moreover, the plugging step includes a masking sub-step, and a filling sub-step.

Figure 8:
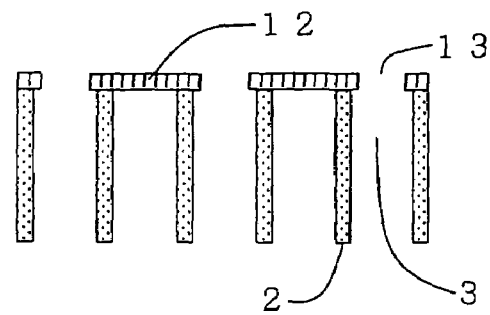
FIG. 8 is a partially enlarged parallel sectional view schematically showing a masking sub-step in the manufacturing method of the present invention.

In the masking sub-step, as shown in FIG. 8, a film 12 is disposed in the end face in such a manner as to mask some cells, that is, cells in which any plugging portion is not formed in the end face. In this step, the film 12 may be attached to the end face in a state in which a hole 13 is made in a portion of the film 12, corresponding to the predetermined cell in which the plugging portion is formed in the end face, that is, the portion of the film disposed on the predetermined cell. After attaching the film 12 which does not have any hole to the end face in such a manner as to cover all the cells, the hole 13 is made in the predetermined cell in which the plugging portion is formed. This is preferable because the hole is correctly made in the targeted cell.

Figure 9A:
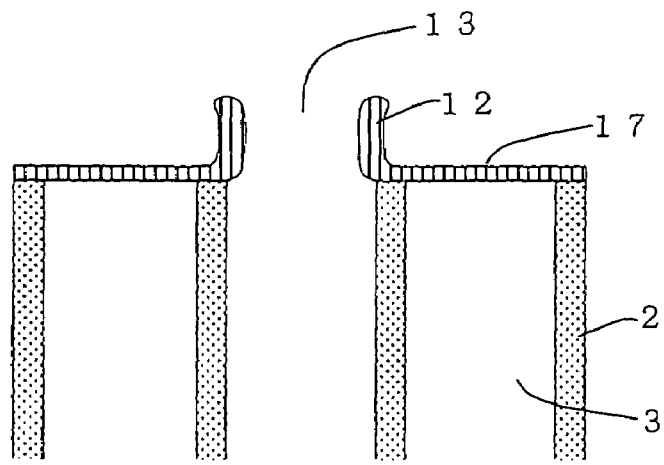
FIG. 9(a) is a partially enlarged parallel sectional view schematically showing one preferable example of the masking sub-step in the present invention.

In a case where the hole 13 is made in the film 12 after disposing the film in this manner, the hole is made in such a manner that the periphery of the hole 13 is raised in a thickness direction of the film, for example, as shown in FIG. 9(a), and this is preferable in that a plugging material can be applied in such a manner as to form a protruding portion having a sufficient height in the filling sub-step. An example of a specific method of making the hole in this manner includes a method in which the film is heated in such a manner as to be molten toward the outside from a center of the hole to make the hole. Further specifically, a predetermined position is preferably irradiated with laser light or the like to make the hole.

There is not any special restriction as to a type of the film. For example, a film which is molted by heating is preferable as a preferable example, and a film which is holed by the laser light is further preferable. The film preferably has an adhesive layer in such a manner that the film is sufficiently fixed after disposed on the end face. Specifically, the film has a substrate layer and the adhesive layer, the substrate layer is formed of a polymer material such as polyester, polyolefin, and halogenated polyolefin, and the adhesive layer is preferably formed of an acryl-based adhesive material. The film has a thickness of about 10 to 100 μm from viewpoints of strength and ease of making the hole.

Figure 14A:
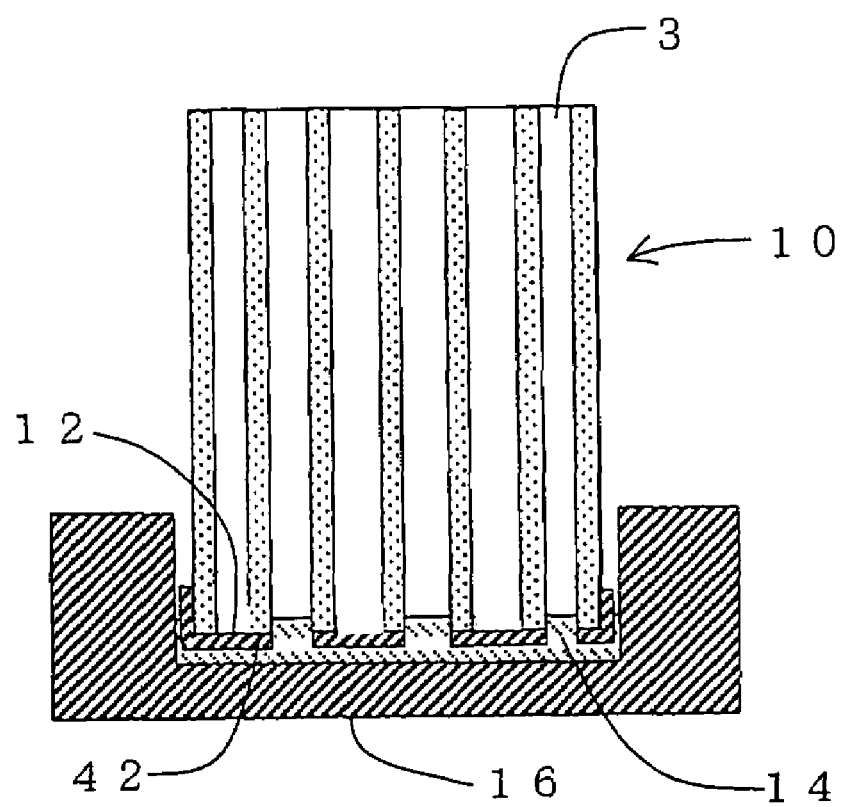
FIG. 14(a) is a parallel sectional view schematically showing a conventional filling sub-step.
Figure 14B:
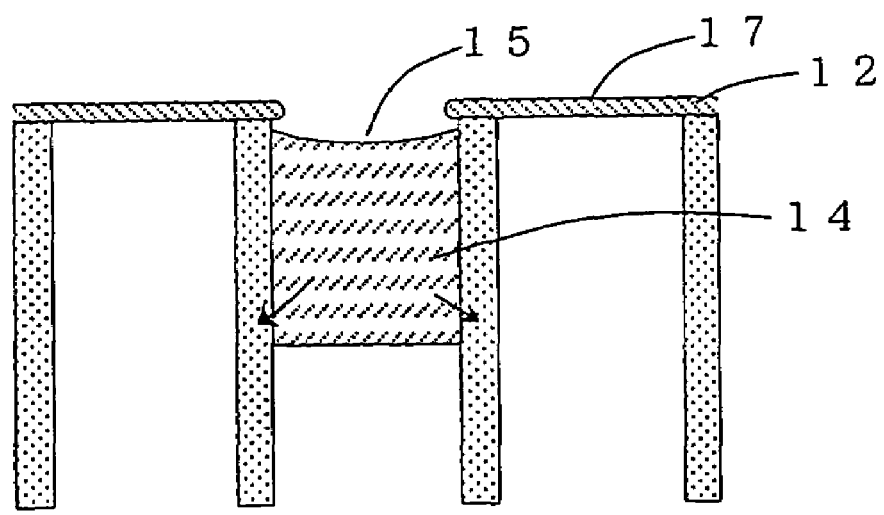
FIG. 14(b) is a partially enlarged parallel sectional view.

In the filling sub-step, the cell in which the hole has been made is filled with a plugging material 14. In a conventional filling step, as shown in FIG. 14(a), the plugging material 14 formed into a water-containing slurry is poured into a slurry container 16, an end face 42 of a masked honeycomb structure 10 is immersed into the plugging material 14 formed into the slurry, and the predetermined cells are filled with the plugging material 14. In this method, when the honeycomb structure 10 is taken out of the slurry container, a liquid in the slurry with which the cells are filled leaches in the porous partition wall or the outer peripheral wall. As shown in FIG. 14(b), a tip 15 of the slurry moves toward the cell from the upper face of the film, and the only plugging portion can be formed having a height equal to or lower than that of the end face of the honeycomb structure.

Figure 10:
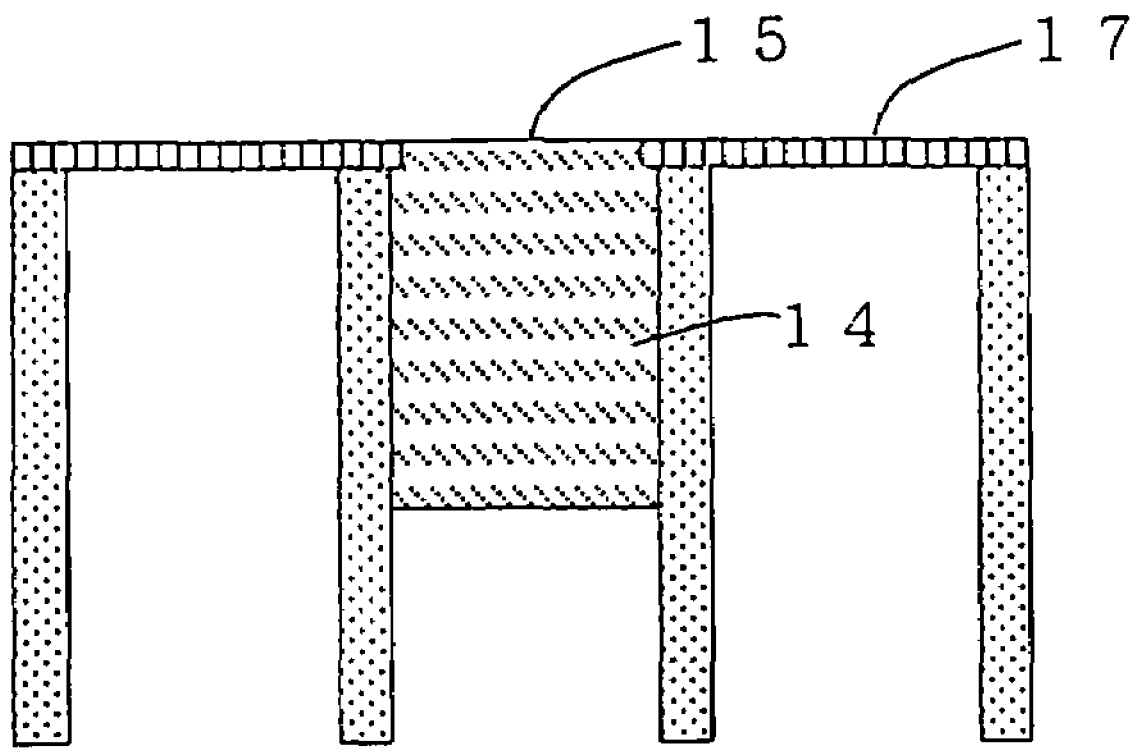
FIG. 10 is a partially enlarged parallel sectional view schematically showing one preferable example of the filling sub-step in the present invention.
Figure 11A:
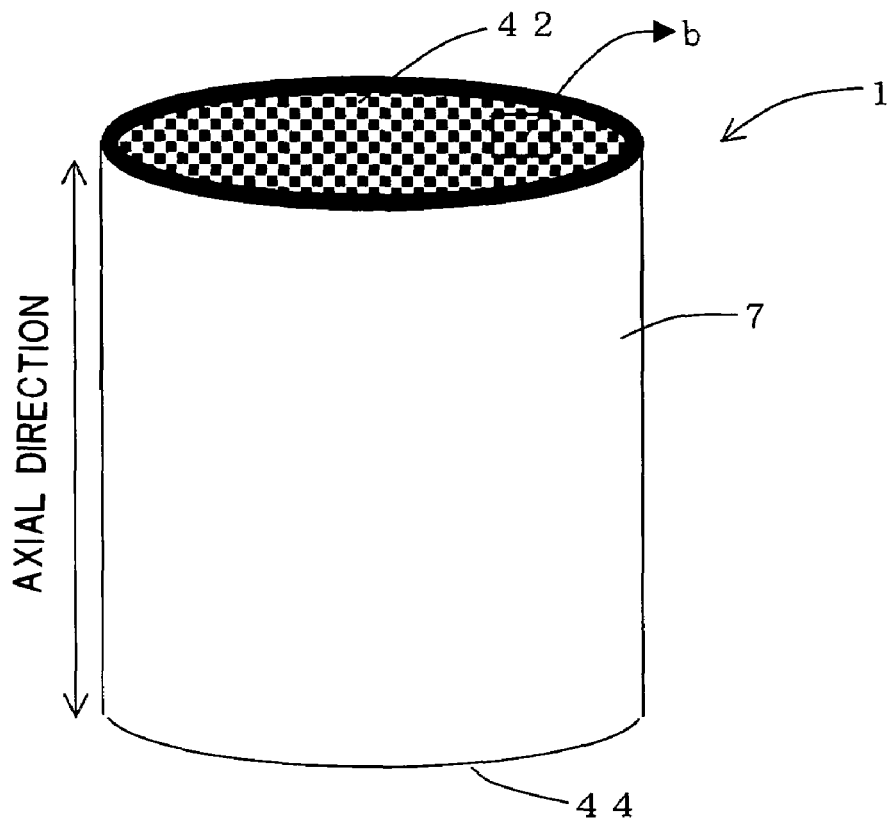
FIG. 11(a) is a schematic perspective view showing one example of a conventional plugged honeycomb filter.
Figure 11B:
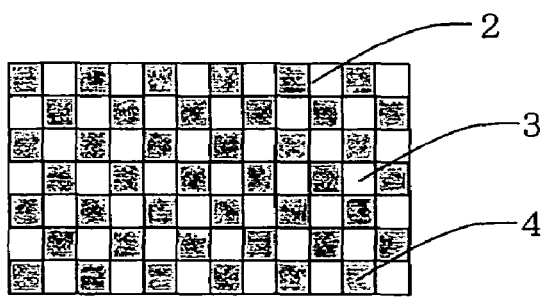
FIG. 11(b) is a partially enlarged plan view.
Figure 11C:
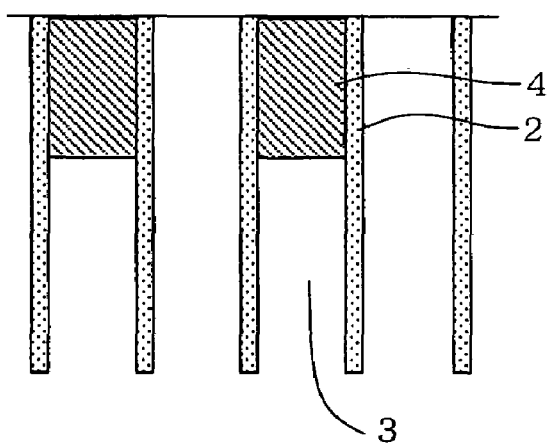
FIG. 11(c) is a partially enlarged parallel sectional view.
Figure 12:
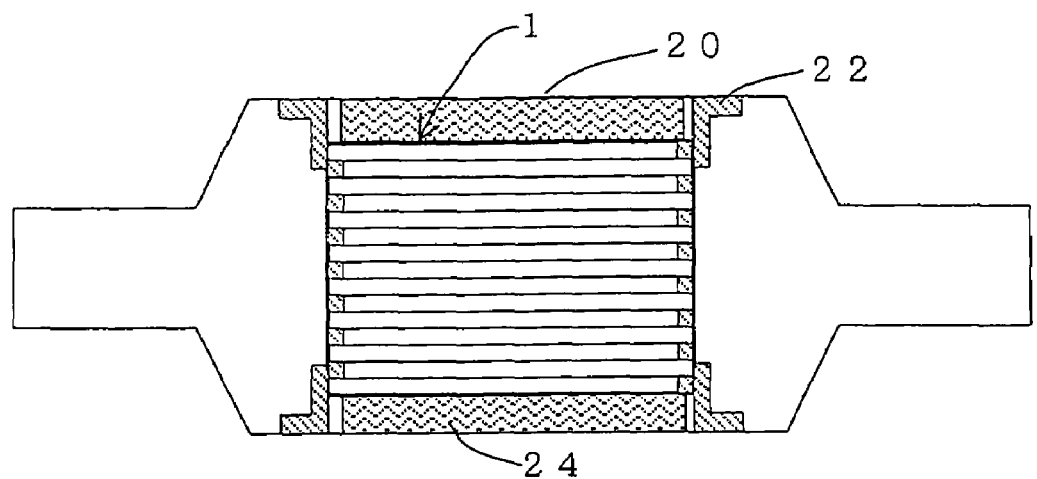
FIG. 12 is a schematic parallel sectional view showing a state in which the conventional honeycomb filter is stored in a can.

In the present invention, as shown in FIG. 10, a plugging material 14 is charged up to a height which is not less than a height equal to that of an upper face 17 of the film, and therefore the plugging portion having the protruding portion can be preferably formed. Here, the upper face of the film means a face of the film on a side opposite to the honeycomb structure. Thus, in a preferable method in which the cell is filled with the plugging material up to the height not less than the height equal to that of the upper face of the film, for example, first the plugging material is applied once, a tip 15 of the plugging material moves toward the cell as shown in FIG. 14(b), and thereafter the plugging material is further applied. This is based on finding that after the tip of the plugging material moves by first filling, the tip of the plugging material hardly moves even when the plugging material is further applied. Usually, the cell can be filled up to the height which is not less than that of the upper face of the film by two applications, but the plugging material may be applied three or more times.

The slurry is poured beforehand in a container for the plugging, the film in which the holes have been made in a zigzag shape is attached beforehand to the honeycomb structure, the structure is fixed to a movable portion of a press with a chuck, the structure is pressed into the container under a pressure of 0.01 to 5 MPa at a speed of 0.1 to 10 mm/sec., and the slurry in the container is injected into the cell from the made holes. The honeycomb structure is chucked in such a manner that the honeycomb end face extends in parallel with the container. When the honeycomb structure is pressed into the container, the honeycomb structure is sealed in such a manner as to prevent a plugging material slurry from being leaked from an outer peripheral portion of the structure. The sealing may be unnecessary in a case where a slurry amount is small in order to set a plugging depth to be small. After completing the press-in, the structure is removed from the container. When the honeycomb structure is slightly rotated, the structure can be easily removed from the container.

Viscosity of the plugging material slurry is preferably in a range of 10 to 1000 dPa·s. When the viscosity is in this range, the slurry is easily held in the cell in a case where the cell is filled with the slurry, and a predetermined plugging portion can be easily formed. Since the slurry does not become excessively hard, the cell can be easily filled with the slurry. The cell partition wall can be prevented from being pushed/broken at a slurry filling time.

The viscosity of the slurry is further preferably in a range of 100 to 600 dPa·s. When the viscosity is in this range, it is possible to preferably suppress a phenomenon in which the liquid in the slurry charged into the cell leaches in the porous partition wall or the outer peripheral wall, kink of the plugging material is reduced, and the number of filling times can be reduced to enhance productivity. Even each corner of the cell is easily filled with the slurry, and a gap can be easily prevented from being generated between a cell corner and the plugging portion.

When the gap is generated between the cell corner and the plugging portion, a capturing performance of the filter degrades. However, when a capturing efficiency is in an allowable range, the gap may be sometimes generated between the cell corner and the plugging portion in order to reduce the pressure loss of the filter or to discharge an ash component deposited in the cell from the gap.

Accordingly, the viscosity of the plugging material slurry is intentionally increased in order to suppress rise of the pressure loss by long-term deposition of the ash component, and the gap is generated.

In another preferable method of filling the cell with the plugging material up to the height which is not less than that of the upper face of the film, a liquid which does not substantially penetrate the partition wall is used in a liquid component in the slurry plugging material, and accordingly the tip of the plugging material is prevented from being moved. By the use of this method, the cell can be filled with the plugging material up to the upper face of the film by one filling. Here, when the liquid does not substantially penetrate, it is meant that the liquid only penetrates to such an extent that a length for moving the tip of the plugging material toward the cell is about 50 μm or less, preferably 30 μm or less, further preferably 10 μm or less. This liquid, that is, a plugging agent slurry is a liquid having high viscosity, and specifically a water content in the slurry is lowered as much as possible, or a thickening agent can be added as an auxiliary agent to the plugging agent slurry to adjust the viscosity.

Moreover, as still another preferable method, there is a method in which a material having a water-absorbing or retaining property is added to the plugging material slurry to reduce a drying speed of the slurry. Since the water-absorbing or retaining material holds the water content, it is possible to suppress a phenomenon in which the water content in the slurry charged into the cell leaches in the porous partition wall or the outer peripheral wall by addition of this material.

Moreover, since the rapid movement of the plugging material or the water content in the slurry is physically inhibited by the added material, an effect of apparently raising the slurry viscosity is supposed to exert an influence, therefore the water-absorbing or retaining material is more preferable, but the material does not necessarily have any water-absorbing or retaining property.

The material preferably decomposes, flies/scatters, and disappears in drying or firing after the plugging/filling, but may not decompose, fly/scatter, or disappear as long as plugging portions characteristic is not adversely influenced during or after the firing, or may react with the plugging material.

Examples of the material which decomposes, flies/scatters, and disappears include: powdered organic materials derived from plant, such as flour, starch, and walnut shell; powdered synthetic resins such as PET, PMMA, phenol resin, polyethylene, and urethane; powdered carbon materials such as graphite, cokes, coal, activated charcoal, and tubular carbon; hollowed synthetic resins such as foaming resin, non-foamed foaming resin, and water-absorbing polymer; and solid liquid or gas materials at normal temperature, such as ice and dry ice. Examples of the material which does not decompose, fly/scatter, or disappear or which reacts with the plugging material include: high-melting materials such as alumina, mullite, aluminum titanate, zirconia, silicon nitride, silicon carbide, titania, tungsten carbide, and molybdenum; porous materials such as silica gel and zeolite; and hollow inorganic materials such as fly ash balloon, silastic balloon, and silica beads. The high-melting material mentioned here is a material having a melting point which is higher than a firing temperature of a plugging material main component. For example, when the plugging material main component is cordierite, nonoxide-based materials are preferable such as silicon nitride and silicon carbide as the high-melting materials because the materials are stable in the firing of cordierite in an oxide atmosphere at about 1400° C.

A shape of the material may be not only particulate but also fibrous, and the powder means that both the particulate and fibrous materials are contained. The material is preferably hollow rather than solid in treatment of a generated gas at a decomposition, flying/scattering, and disappearing time. These materials may be used alone or compounded. Added amounts of these materials are appropriately determined based on settings of viscosity of the plugging slurry and plugging material porosity after the firing, and therefore are not especially restricted.

Among the materials, the hollow synthetic resins like the foaming resin, non-foamed foaming resin, and water-absorbing polymer, and porous materials such as silica gel have water-absorbing properties, and are preferable for the above-described reason. After filling the cell with the plugging material, a material is added which causes volume expansion by thermal treatment or the like. Accordingly, the plugging material in the cell causes the volume expansion, the plugging portion protrudes from the filter end face, and the protruding portion can be easily formed. For example, when the non-foamed foaming resin is added to the plugging material beforehand, and the cell is filled with the plugging material and thermally treated at 100 to 250° C., the non-foamed resin foams, and the volume of the plugging portion expands. Furthermore, for example, when the water-absorbing synthetic resin or urethane is added to the plugging material beforehand, the cell is filled with the plugging material, and thereafter the water content is added to the plugging material, the volume of the water-absorbing synthetic resin or urethane is expanded to expand the volume of the plugging portion. Additionally, when bubbles are intentionally generated in the plugging material slurry, and the cell is filled with the slurry in such a manner that the bubbles remain in the plugging portions, the porosity of the plugging portion can be raised.

Moreover, when various materials are added, the porosity of the plugging portion increases, the thermal capacity of the plugging portion is lowered, and burning of particulate matters (PM) in the filter is promoted. Furthermore, even in a case where a catalyst is carried in the filter, the PM is oxidized/burnt utilizing activity of the catalyst, and toxic components in the exhaust gas are treated, there is an effect that the thermal capacity of the plugging portion is lowered to thereby enhance the catalyst activity. On the other hand, in a conventional technique, filter temperature does not easily rise especially in the cell in the vicinity of the plugging portion because of high thermal capacity of the plugging portion, and the catalyst activity drops. Furthermore, when the porosity of the plugging portion is increased, or since the plugging portion has a difference in rigidity from a region between the plugging portions on opposite ends of the filter, the rigidity of the plugging portion is lowered, accordingly the rigidity difference is reduced, and the resistance to thermal shock of the filter is enhanced. Stress concentration in the vicinity of the plugging portion can be relaxed in a case where the filter outer peripheral surface is grasped by a mat or the like. When the porosity of the plugging portion is raised, sufficient permeability is imparted to the plugging portion, the exhaust gas can pass through the plugging portion, and there is an effect of reducing the pressure loss of the filter. Furthermore, when the rigidity of the honeycomb substrate is brought close to that of the plugging portion in a stage of manufacturing the filter, cracks can be reduced in the vicinity of the plugging portion at a firing time.

Figure 9B:
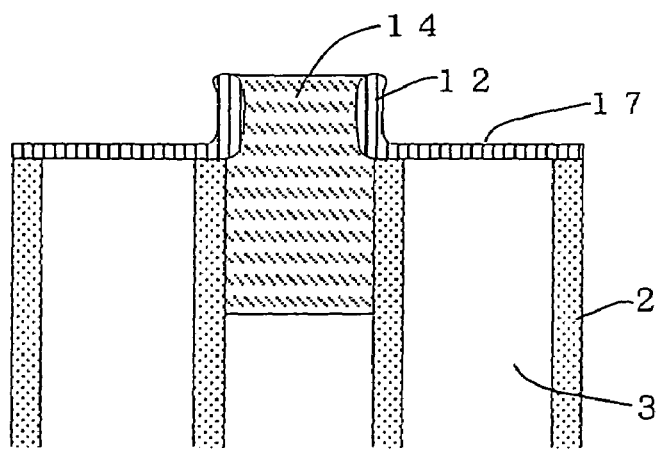
FIG. 9(b) is a partially enlarged parallel sectional view schematically showing one preferable example of a filling sub-step.

Moreover, when the cell is filled with the plugging material in this method, in the masking sub-step, as shown in FIG. 9($a$), the holes are made in such a manner that the peripheries of the holes 13 are raised in the film thickness direction, accordingly, as shown in FIG. 9($b$), the cells can be filled with the plugging materials 14 up to positions higher than the upper face 17 of the film, and the protruding portions can be formed whose tips are disposed in positions higher than the upper face of the film. Even when the liquid leaches in the partition wall or the like, and the tip of the plugging material moves toward the cell, it is possible to hold the tip of the plugging material at the height which is not less than that of the upper face of the film.

After the filling sub-step, the plugging portions having the protruding portions can be formed usually by drying, heating, and/or firing. It is to be noted that, in general, the honeycomb structure can be manufactured by firing after forming as described later, but the plugging step may be performed with respect to a formed article having the honeycomb structure before the firing, or may be performed with respect to a fired article having the honeycomb structure after the firing.

In the honeycomb structure according to the present invention, for example, a raw material is a powder of at least one type of material selected from a group consisting of: various ceramics such as cordierite, mullite, alumina, spinel, zirconia, silicon carbide, silicon carbide-cordierite-based composite material, silicon-silicon carbide-based composite material, silicon nitride, lithium aluminum silicate, aluminum titanate, and zeolite; metals such as an Fe—Cr—Al-based metal; and a combination of them. To this raw material, binders are added such as methyl cellulose and hydroxypropoxyl methyl cellulose. Furthermore, surfactant and water are added to form a plastic puddle, and the puddle is extruded into a honeycomb shape. Alternatively, after forming the honeycomb shape, the honeycomb structure can be prepared by the firing. Various ceramics and metals are preferable as main components of the plugging material, at least one type is further preferably selected from the group of the preferable raw materials of the honeycomb structure, and the raw material is especially preferably common to that of the honeycomb structure to be plugged. Moreover, this main component is a main component of the plugging portion.

EXAMPLE AND COMPARATIVE EXAMPLE

A manufacturing method of the present invention will be described hereinafter further specifically based on one specific example. First, as a raw material blending and kneading step, a foaming resin is added as a pore former to silica, kaolin, talc, and alumina which are cordierite materials, further a binder, dispersant, and water are added, the materials are kneaded into a clay form. The pore former may have such a property that the former flies/scatters/disappears by a firing step. Inorganic materials such as a carbon material, a polymer compound such as a plastic material, and an organic material such as starch may be used alone or in combination. Next, as a forming and drying step, the kneaded clay-like material is used, and extruded to form a honeycomb structure, and the structure is dried. As drying means, various methods can be performed, but the drying is preferably performed in a method of combination of microwave drying and hot-air drying, or induction drying and hot-air drying. Additionally, a special method such as freezing/drying is applicable. Next, opposite end faces of the dried honeycomb structure is cut into predetermined lengths.

Next, the process shifts to a plugging step. First, in a masking sub-step, a film is disposed on the end face. As a film material, a polyester film (maker: Teraoka Seisakusho, model number: 631S#25, film thickness: 50 µm) is used. One face of the film is coated with an adhesive, and the film is attached to the end face of the honeycomb structure. Next, cell openings are made into zigzag shapes in the honeycomb structure end face to which the polyester film has been attached by an NC scannable laser apparatus. When the holes are made, the film melts, and peripheries of the holes are raised by influence of the melting.

Next, the process shifts to a filling sub-step. Water, binder, and glycerin are added to the cordierite material to form a slurry of about 200 dPa·s, the slurry is poured in a plugging container beforehand, and the honeycomb structure is fixed to a movable portion of a press machine with a chuck. The film has been attached to the honeycomb structure, in which the holes have been made in the zigzag shapes. The structure is pressed into the container at a pressure of 0.25 MPa at a speed of 1 mm/sec, and the slurry in the container is injected into the cells from the made holes. The honeycomb structure is pressed into the container in such a manner that end face of the honeycomb structure extends in parallel with the container. When the honeycomb structure is pressed into the container, the honeycomb structure is sealed in such a manner as to prevent a plugging material slurry from being leaked from an outer peripheral portion of the structure. After completing the press-in, the structure is removed from the container. When the honeycomb structure is slightly rotated, the structure can be easily removed from the container. The plugging portions for plugging the cells are formed in the end faces of the honeycomb structure in this manner. Since a water content in the injected slurry is absorbed by the honeycomb structure, the plugging material kinks, and a tip of the plugging portion is inside a film upper-face position (rising upper-face position around the hole). Here, the plugging material slurry is inserted into the made holes. When the water content of the plugging material slurry is adjusted to thereby increase slurry viscosity to 450 dPa·s, the kink of the plugging material can be suppressed. Furthermore, even when 5% of a foaming resin is added, the kink of the plugging material can be reduced.

Next, to dry a plugging agent, hot air at 140° C. is applied to the plugged end face of the honeycomb structure to dry the structure for about five minutes without peeling the film. The drying is possible even with a hot plate. When the film is peeled after the drying, the tip portion of the plugging is plugged into a convex shape. This is similarly performed with respect to another end face, and accordingly protruding portions can be formed on the plugging portions on opposite end faces. Thereafter, when the firing is performed, a cordierite plugged honeycomb structure is obtained.

When porosity was measured by a mercury porosimeter with respect to a partition wall of the cordierite plugged honeycomb structure actually obtained based on the above-described method, the porosity was 67%, and an average pore diameter was 27 µm. The cell had a quadrangular shape having a partition wall thickness of about 0.3 mm, and a cell pitch of about 1.6 mm, and filter dimensions were a diameter of about 191 mm, and a length of about 200 mm. A plugging length from a filter end face to a cell passage inner direction was set to about 3 mm, and a height of the protruding portion was set to 0.2 to 0.4 mm (flatness in the whole protruding portion: 0.2 mm).

The plugged honeycomb structure having the protruding portions were manufactured in this manner based on the present invention, pressed/grasped as a DPF into a metal case (can member) with a ceramic mat (trade name: Interam Mat, manufactured by 3M Co., Ltd.), thereafter opposite end faces of the DPF were fixed with fixing members, the fixing members were welded to the metal case, and the metal case was connected to a cone to manufacture a converter assembly. A converter assembly was also manufactured using a conventional plugging structure DPF without any protruding portion. The manufactured converter assembly was connected to an exhaust system of an actual diesel engine (displacement: about 5 liters), an exhaust gas was passed to perform a heating/cooling test, and the converter assembly was disassembled to check the DPF. Then, cracks were generated in a DPF end face outer peripheral portion in the converter assembly having a conventional structure, but any crack was not generated in a DPF end face outer periphery in the converter assembly by the present invention.

INDUSTRIAL APPLICABILITY

As described above, a plugged honeycomb structure of the present invention does not easily break, and is capable of enhancing durability so that the structure is preferably usable in a filter such as a DPF. By a method of manufacturing a plugged honeycomb structure of the present invention, this plugged honeycomb structure can be preferably prepared.

The invention claimed is:

1. A plugged honeycomb structure comprising:
   partition walls arranged in such a manner as to form a plurality of cells extending from one end face to the other end face through an axial direction;
   an outer peripheral wall which surrounds an outer periphery of the partition wall; and
   plugging portions disposed in such a manner as to plug the cell in either end face,
   characterized in that at least some of the plugging portions arranged in the vicinity of the outer peripheral wall protrude from both end faces and a tip of the protruding portion is substantially flat, wherein the corners of the protruding portion directly connected to the tip are chamfered.

2. The plugged honeycomb structure according to claim 1, wherein some or all of the plugging portions arranged in a portion other than the vicinity of the outer periphery protrude from the end face, and the tip of the protruding portion is substantially flat or has the moderate curved face.

3. The plugged honeycomb structure according to claim 1, comprising a plugging portion including a protruding portion including a portion whose sectional shape crossing the axial direction at right angles is substantially circular.

4. The plugged honeycomb structure according to claim 1, comprising a plugging portion including a protruding portion including a portion whose sectional shape crossing the axial direction at right angles is a substantially polygonal shape.

5. The plugged honeycomb structure according to claim 4, wherein the substantially polygonal shape has a shape whose corner portion has been cut into a linear or curved shape.

6. The plugged honeycomb structure according to claim 1, comprising a plugging portion including a protruding portion whose sectional shape parallel to the axial direction is a substantially quadrangular shape.

7. The plugged honeycomb structure according to claim 6, wherein the substantially quadrangular shape is a shape whose corner portion has been cut into a linear or curved shape.

8. The plugged honeycomb structure according to claim 1, wherein a maximum height from the end face to the tip of each protruding portion is substantially equal.

9. The plugged honeycomb structure according to claim 1, wherein porosity of the protruding portion is smaller than that of another portion of the plugged honeycomb structure.

10. The plugged honeycomb structure according to claim 1, wherein at least some of the plugging portions located in a central portion at one end face of the honeycomb structure do not protrude.

* * * * *